US006359917B1

(12) United States Patent
Cutler et al.

(10) Patent No.: US 6,359,917 B1
(45) Date of Patent: Mar. 19, 2002

(54) DETECTION METHOD AND DETECTOR FOR GENERATING A DETECTION SIGNAL THAT QUANTIFIES A RESONANT INTERACTION BETWEEN A QUANTUM ABSORBER AND INCIDENT ELECTRO-MAGNETIC RADIATION

(75) Inventors: Leonard S. Cutler; Miao Zhu, both of Palo Alto, CA (US)

(73) Assignee: Agilent Technolgoies, Inc., Palo Alto, CA (US)

( * ) Notice: Subject to any disclaimer, the term of this patent is extended or adjusted under 35 U.S.C. 154(b) by 17 days.

(21) Appl. No.: 09/588,032

(22) Filed: Jun. 5, 2000

(51) Int. Cl.[7] ................................................ H01S 3/13

(52) U.S. Cl. ............................ 372/32; 372/29; 372/98; 372/9; 372/108

(58) Field of Search .............................. 372/29, 32, 11, 372/9, 26, 108, 69, 98

(56) References Cited

U.S. PATENT DOCUMENTS 6,201,821 B1 * 1/2001 Zhu et al. .................... 372/32

* cited by examiner

*Primary Examiner*—Leon Scott, Jr.
(74) *Attorney, Agent, or Firm*—Ian Hardcastle

(57) ABSTRACT

A detection signal that quantifies a resonant interaction between a quantum absorber and incident electro-magnetic radiation is generated. The quantum absorber is irradiated with the incident electro-magnetic radiation. The quantum absorber absorbs a portion of the incident electro-magnetic radiation and generates fluorescent electro-magnetic radiation in response to it. The quantum absorber additionally transmits the unabsorbed portion of the incident electro-magnetic radiation. The unabsorbed portion of the incident electro-magnetic radiation is detected to generate a first signal that has a first signal-to-noise ratio. The fluorescent electro-magnetic radiation is detected to generate a second signal that has a second signal-to-noise ratio. The first signal and the second signal are combined to generate the detection signal. The detection signal has a signal-to-noise ratio greater than the first signal-to-noise ratio and the second signal-to-noise ratio.

19 Claims, 5 Drawing Sheets

DETECTION METHOD AND DETECTOR FOR GENERATING A DETECTION SIGNAL THAT QUANTIFIES A RESONANT INTERACTION BETWEEN A QUANTUM ABSORBER AND INCIDENT ELECTRO-MAGNETIC RADIATION

RELATED DISCLOSURES

This disclosure is related to the following simultaneously-filed disclosures that are incorporated herein by reference:

Coherent Population Trapping-Based Method for Generating a Frequency Standard Having a Reduced Magnitude of Total a.c. Stark Shift of inventors Miao Zhu and Leonard S. Cutler Ser. No. 09/588,045;

Coherent Population Trapping-Based Frequency Standard Having a Reduced Magnitude of Total a.c. Stark Shift of inventors Miao Zhu and Leonard S. Cutler Ser. No. 09/587,719; and Coherent Population Trapping-Based Frequency Standard and Method for Generating a Frequency Standard Incorporating a Quantum Absorber that Generates the CPT State with High Efficiency of inventor Miao Zhu Ser. No. 09/587,717.

FIELD OF THE INVENTION

The invention relates to high-precision instruments, such as frequency standards, magnetometers and laser spectrometers, that detect a resonant interaction between incident electro-magnetic radiation and a quantum absorber, and in particular relates to a detection method, a detector and a high-precision instrument in which a high signal-to-noise ratio detection signal is generated that quantifies the resonant interaction between the quantum absorber and the incident radiation.

BACKGROUND OF THE INVENTION

High-precision instruments, for example, frequency standards, magnetometers and laser spectrometers, are known in the art. Such instruments generate an electronic detection signal that quantifies a resonant interaction between incident electro-magnetic radiation and a quantum absorber. The detection signal is then used to control, or to enable measurement of, a characteristic of the incident electro-magnetic radiation, such as the frequency of a frequency component of the electro-magnetic radiation or an external magnetic field.

In such precision instruments, the quantum absorber is irradiated with the incident electro-magnetic radiation from by a suitable source. The quantum absorber in a lower quantum state can absorb one or more photons from the incident electro-magnetic radiation, and moves to an upper quantum state. This absorption process decreases the intensity of the electro-magnetic radiation transmitted by the quantum absorber. When the quantum absorber in the upper quantum state decays spontaneously to the lower quantum state, it emits one or more photons of fluorescent electro-magnetic radiation. The rate of the absorption and re-emission process depends on a number of conditions in the photon-quantum absorber interaction.

For a specific application, the rate of the absorption and re-emission process is designed to depend on a specific resonance condition, such as an optical resonance condition, that is satisfied when the frequency of the incident electro-magnetic radiation, or a frequency component thereof, equals the transition frequency of the quantum absorber.

When this resonance condition is satisfied, the rate of the absorption and re-emission process changes. Consequently, the resonance condition can decrease the transmitted electro-magnetic radiation and increase the fluorescent electro-magnetic radiation, or vice versa.

The resonance condition is conventionally detected by detecting only the transmitted electro-magnetic radiation or by detecting only the fluorescent electro-magnetic radiation. In such detection schemes, the quantification of the resonance condition is usually limited by the signal-to-noise ratio of the electrical signal generated by detecting only the transmitted electro-magnetic radiation or by detecting only the fluorescent electro-magnetic radiation. The limitation on the quantification of the resonance condition limits the stability and accuracy of the high-precision instrument that employs it.

Thus, what is needed is a detection method and detector that generate a detection signal having as large a signal-to-noise ratio as possible. Such a detection method and detector will increase the accuracy and stability of any high-precision instrument whose accuracy and stability was formerly limited by the signal-to-noise ratio of the detection signal.

SUMMARY OF THE INVENTION

The invention provides a detection method, detector and high-precision instrument in which both the transmitted electro-magnetic radiation and the fluorescent electro-magnetic radiation are detected to generate respective electrical signals, and in which the electrical signals are combined with an optimized relative weighting to generate the detection signal. The detection signal has a signal-to-noise ratio greater than the signal-to-noise ratios of the electrical signals generated by detecting the transmitted electro-magnetic radiation alone or by detecting the fluorescent electro-magnetic radiation alone. The improved signal-to-noise ratio of the detection signal enables the detection signal to provide a more accurate and stable quantification of the resonance condition of interest.

Specifically, the invention provides a detection method for generating a detection signal that quantifies a resonant interaction between a quantum absorber and incident electro-magnetic radiation. In the method, the quantum absorber is irradiated with the incident electro-magnetic radiation. The quantum absorber absorbs a portion of the incident electro-magnetic radiation and generates fluorescent electro-magnetic radiation in response to it. The quantum absorber additionally transmits the unabsorbed portion of the incident electro-magnetic radiation. The unabsorbed portion of the incident electro-magnetic radiation is detected to generate a first signal that has a first signal-to-noise ratio. The fluorescent electro-magnetic radiation is detected to generate a second signal that has a second signal-to-noise ratio. The first signal and the second signal are combined to generate the detection signal. The detection signal has a signal-to-noise ratio greater than the first signal-to-noise ratio and the second signal-to-noise ratio.

The invention also provides a detector for generating a detection signal that quantifies a resonant interaction between a quantum absorber and incident electro-magnetic radiation. The detector comprises a first detector, a second detector and a combiner. The first detector is located to receive a portion of the incident electro-magnetic radiation that remains unabsorbed by the quantum absorber, and operates to generate a first signal in response to the unabsorbed portion. The first signal has a first signal-to-noise ratio. The second detector is located to receive fluorescent electro-magnetic radiation generated by the quantum absorber in response to the incident electro-magnetic radiation, and operates to generate a second signal in response to the fluorescent electro-magnetic radiation. The second signal has a second signal-to-noise ratio. The combiner is connected to receive the first signal and the second signal and operates to generate the detection signal from the first and second electrical signals. The detection signal has a signal-to-noise ratio greater than the first signal-to-noise ratio and the second signal-to-noise ratio.

Finally, the invention provides a precision instrument that comprises a source of incident electro-magnetic radiation, a quantum absorber, a first detector, a second detector and a combiner. The quantum absorber is located to receive the incident electro-magnetic radiation from the source. The quantum absorber absorbs a portion of the incident electro-magnetic radiation and generates fluorescent electro-magnetic radiation in response to the incident electro-magnetic radiation. The quantum absorber additionally transmits an unabsorbed portion of the incident electro-magnetic radiation. The first detector is located to receive the unabsorbed portion of the incident electro-magnetic radiation, and operates to generate a first signal in response to the unabsorbed portion. The first signal has a first signal-to-noise ratio. The second detector is located to receive the fluorescent electro-magnetic radiation, and operates to generate a second signal in response to the fluorescent electro-magnetic radiation. The second signal has a second signal-to-noise ratio. The combiner is connected to receive the first signal and the second signal, and operates to generate a detection signal from the first and second electrical signals. The detection signal has a signal-to-noise ratio greater than the first signal-to-noise ratio and the second signal-to-noise ratio.

DETAILED DESCRIPTION OF THE INVENTION

Figure 1:
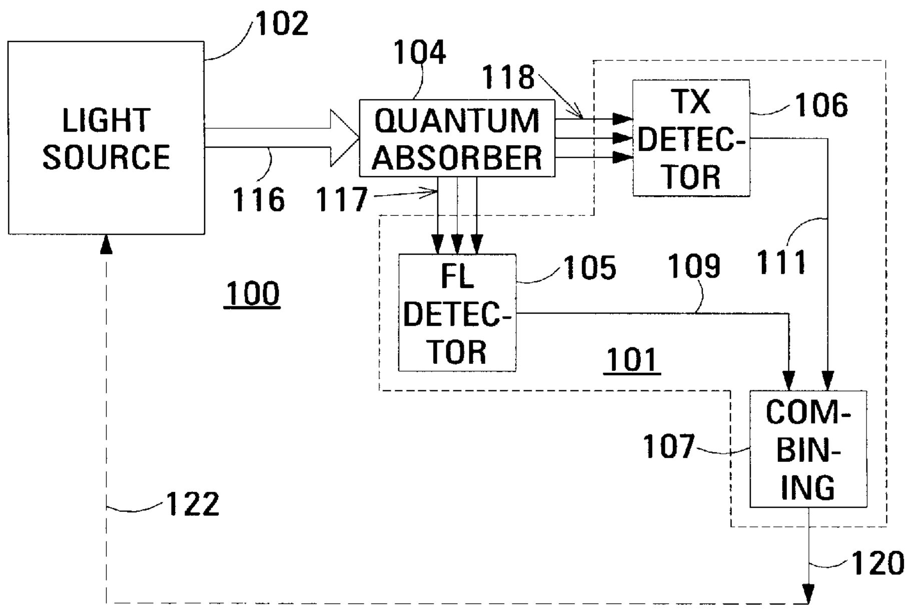
FIG. 1 is a schematic block diagram showing an embodiment of a high-precision instrument according to the invention incorporating a detector according to the invention that performs the detection method according to the invention.

FIG. 1 is a schematic block diagram showing a highly simplified embodiment 100 of a high-precision instrument according to the invention incorporating a detector 101 according to the invention that performs the detection method according to the invention. The detection method will be described below. The high-precision instrument is composed of the light source 102, the quantum absorber 104 and the detector 101 according to the invention.

The light source 102 generates the incident light 116 that illuminates the quantum absorber 104. The quantum absorber has transitions including a transition having an energy that corresponds to a transition frequency of $\omega$. The incident light 116 includes at least one main frequency component having a frequency of $\Omega$, suitable for driving the transition of the quantum absorber 104 having a transition frequency of $\omega$. The quantum absorber and the light source will be described in greater detail below with reference to FIG. 6.

The detector 101 is located to detect two types of electro-magnetic radiation from the quantum absorber 104 and generates the detection signal 120 in response to the electro-magnetic radiation. The two types of electro-magnetic radiation detected by the detector are the unabsorbed portion of the incident light transmitted through the quantum absorber, i.e., the transmitted light 118, and the fluorescent light 117 generated by the quantum absorber in response to the incident light.

In the example shown, the detector 101 is composed of the fluorescent light detector 105, the transmitted light detector 106 and the combiner 107. The fluorescent light detector and the transmitted light detector each have an electrical output connected to an input of the combiner. The combiner generates the detection signal 120.

The incident light 116 illuminates the quantum absorber 104 and is absorbed at least in part by the quantum absorber. The fluorescent light 117 generated by the quantum absorber in response to the incident light is detected by the fluorescent light detector 105, which generates the electrical signal 109 in response thereto. The electrical signal 109 has a signal-to-noise ratio. The portion of the incident light that remains unabsorbed is transmitted by the quantum absorber as the transmitted light 118 and is detected by the transmitted light detector 106 which generates the electrical signal 111 in response thereto. The electrical signal 111 has a signal-to-noise ratio. The combiner 107 combines the electrical signals 109 and 111 to generate the detection signal 120. The detection signal has a signal-to-noise ratio greater than the signal-to-noise ratio of either of the electrical signals 109 and 111.

Figure 2:
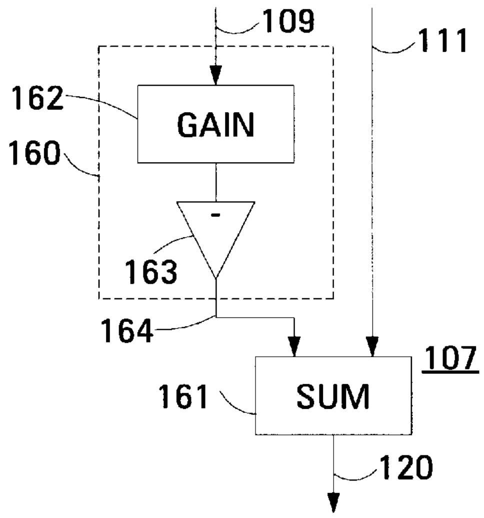
FIG. 2 is a schematic block diagram showing an embodiment of the detector according to the invention in greater detail.

FIG. 2 is a schematic block diagram showing the structure of an example of the combiner 107. The combiner is composed of the weighting element 160 and the summing element 161. In the example shown, the weighting element receives the electrical signal 109 from the fluorescent light detector 105 and applies weighting to it to generate the weighted signal 164 is weighted relative to the electrical signal 111 generated by the transmitted light detector 106. The weighting element feeds weighted electrical signal 164 to the summing element 161. The summing element also receives the electrical signal 111 directly from the transmitted light detector.

The weighting element 160 is shown as including the gain element 162 and the sign inverter 163. The gain element receives the electrical signal 109 and either amplifies or attenuates it by a factor that changes the level of the electrical signal 109 by the factor α defined in equation (3) below. As a result, the level of the signal 164 is changed relative to that of the electrical signals 109 and 111.

The sign inverter 163 inverts the polarity of electrical signal output by the gain element 162 to generate the weighted signal 164 with the opposite polarity to that of the electrical signal 109. The sign inversion is required when it is desired for the summing element 161 to subtract of one of the weighted electrical signals from the other and the polarities of the electrical signals 109 and 111 are such that the summing element would add them. The sign inverter may be integral with the gain element. Alternatively, the sign inversion can be performed by the summing element.

The weighting element 160 may alternatively receive both electrical signals 109 and 111 change the levels of both of them by different amounts to change the relative gain by the factor α. The weighting element may alternatively receive the electrical signal 111 and not the electrical signal 109, and change the level of the electrical signal 111 relative to that of the electrical signal 109. The gain element 162 may be omitted if the detectors 105 and 106 generate the electrical signals 109 and 111 at signal levels relative to their respective noise levels that satisfy equation (3) below. The sign inverter 163 may be omitted if the detectors 105 and 106 generate the electrical signals 109 and 111 with the appropriate polarity relationship. The entire weighting element 160 may be omitted if the detectors 105 and 106 generate the electrical signals 109 and 111 with the appropriate polarity relationship and at signal levels relative to their respective noise levels that satisfy equation (3) below.

The summing element 161 sums the electrical signal 111 and the weighted electrical signal 164 to generate the detection signal 120. As noted above, the summing element may invert the sign of one of the signals prior to summing them to subtract the signals from one another.

The electrical signals 109 and 111 may be analog signals or digital signals. In the latter case, the functions of the gain element 162, the sign inverter 163 and the summing element 161 may be realized by digitally processing the digital signals. The detection signal 120 may be an analog signal, a digital signal or both.

The gain element 162 is described above as changing the level of the electrical signal 109 by a factor α. The factor a may be fixed, or may be dynamically determined by measuring the signal-to-noise ratios of the electrical signals 109 and 111, and determining values of α therefrom using equation (3) below. Alternatively, the value of a may be optimized by measuring the signal-to-noise ratio of the detection signal 120.

Figure 3A:
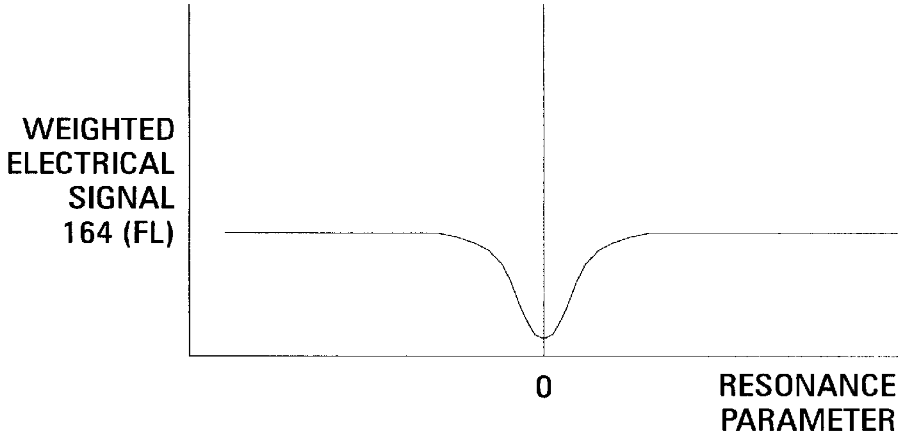
FIGS. 3A, 3B and 3C are graphs showing examples of the variation of the electrical signal generated by the fluorescent light detector, the electrical signal generated by the transmitted light detector and the detection signal, respectively, with a resonance parameter.
Figure 3B:
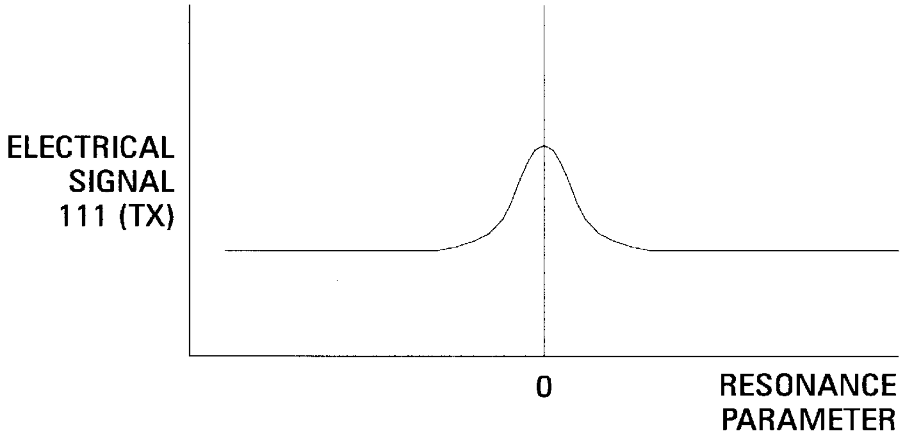

FIGS. 3A and 3B are graphs showing how the weighted electrical signal 164 derived by the weighting element 160 from the electrical signal 109 generated by the fluorescent light detector 105 and the electrical signal 111 generated by the transmitted light detector 106, respectively, vary with a resonant condition of interest. The graphs show the variation of the weighted electrical signal 164 and the electrical signal 111 with the change in the resonance parameter. The resonance condition is satisfied at zero on the resonance parameter axis. In some applications, the sense of the variations may be opposite to that shown. Examples of the resonance parameter include an optical frequency, a frequency difference and an external magnetic field.

FIG. 3A shows how the weighted electrical signal 164, which is proportional to the fluorescent light 117, sharply decreases relative to the background level as the resonance condition is approached. FIG. 3B shows how the electrical signal 111, which is proportional to the transmitted light 118, sharply increases relative to the background level as the resonance condition is approached. The sharp increase in the transmitted light corresponds to a sharp decrease in the absorption of the incident light 116 by the quantum absorber 104 as the resonance condition is approached.

Figure 3C:
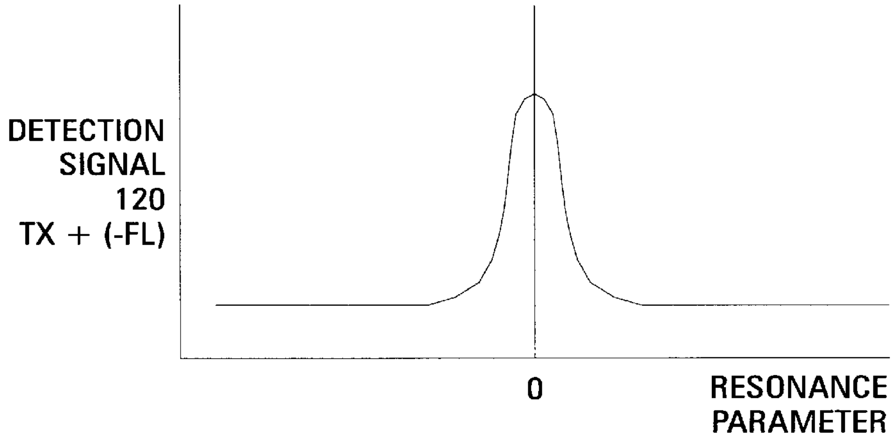

FIG. 3C shows the detection signal 120 generated by the summing element 161 of the combiner 107. In this example, the summing element inverts the sign of the weighted electrical signal 164, derived from the electrical signal 109 output by the fluorescent light detector 105, and adds the result to the electrical signal 111 output by the transmitted light detector 106. The detection signal 120 has a higher signal-to-noise ratio than either of the electrical signals 109 and 111.

Figure 6:
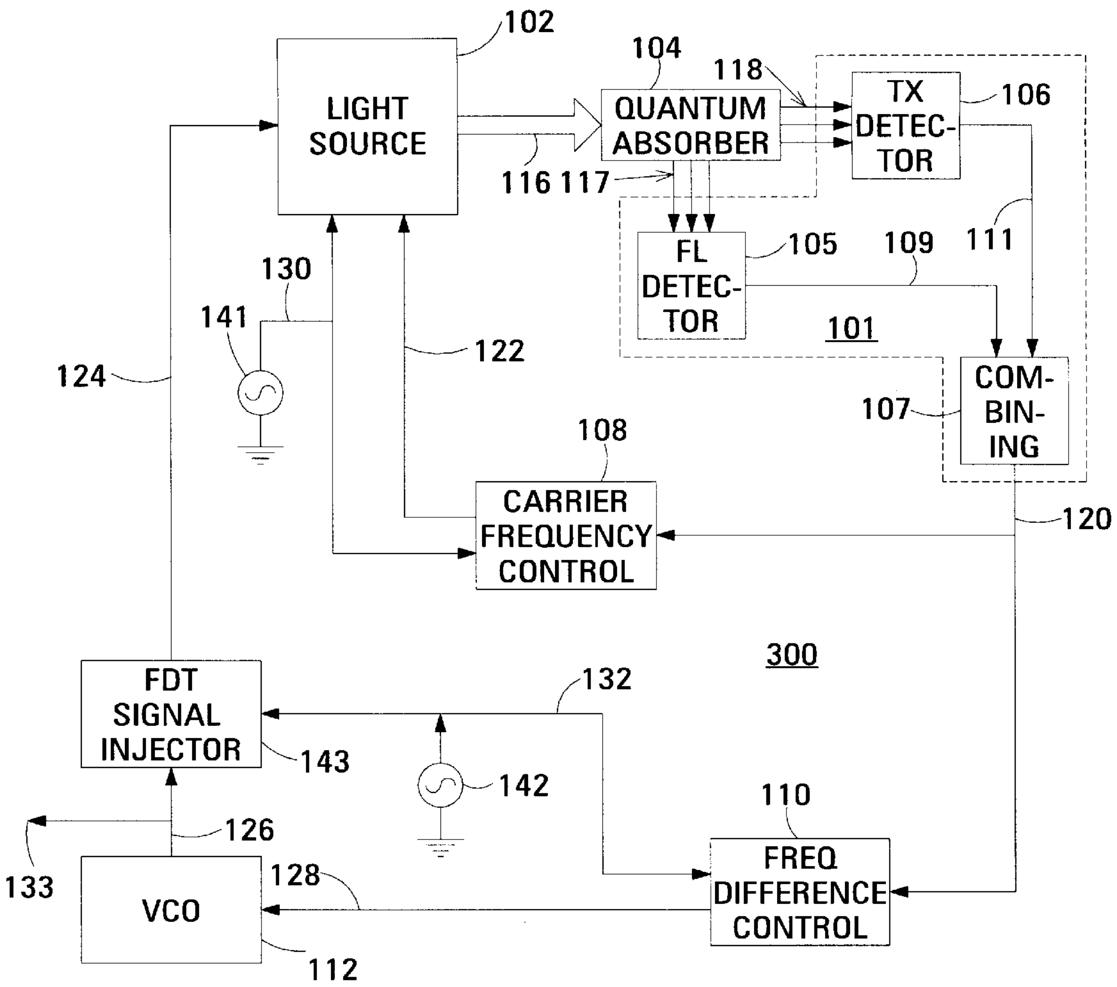
FIG. 6 is a schematic block diagram showing a first embodiment of a CPT-based frequency standard according to the invention incorporating the detector according to the invention.

If the detection signal 120 were used as a feedback signal to vary the frequency of the frequency component generated by the light source 102 to lock the frequency of the frequency component to the transition frequency of the transition of the quantum absorber 104, for example, as indicated by the broken line 122, the stability and accuracy with which the frequency of the frequency component is controlled using the detection signal 120 would be substantially greater than if either of the electrical signals 109 or 111 were used. This is also true when conventional techniques, such as those that will be described below with reference to FIG. 6, are used for finding the minimum or the maximum, collectively, the extremum, in the detection signal 120.

As noted above, to maximize the signal-to-noise ratio of the detection signal 120 compared with the signal-to-noise ratios of the electrical signals 109 and 111 respectively generated by the fluorescent light detector 105 and the transmitted light detector 106, the electrical signals 109 and 111 must have appropriate levels relative to one another.

Let $S_{FL}$ and $N_{FL}$ be the levels of the signal and the noise, respectively, of the electrical signal 109 generated by the fluorescent light detector 105.

Let $S_{TX}$ and $N_{TX}$ be the levels of the signal and the noise, respectively, of the electrical signal 111 generated by the transmitted light detector 106.

Let $SN_D$ be the total signal-to-noise power ratio of the detection signal 120.

Let r be the correlation factor between the noises. An amplitude noise component in the incident light 116 would generate a positive correlation between the noises.

Let α be the weighting factor by which the electrical signal 109 is multiplied prior to being summed with the electrical signal 111. This weighting factor is varied to optimize the signal-to-noise ratio of the detection signal 120. The weighting factor can have any positive value, i.e., the electrical signal 109 can be amplified or attenuated relative to the electrical signal 111.

$$SN_D = \frac{(S_{TX} + aS_{FL})^2}{N_{TX}^2 + a^2N_{FL}^2 - 2arN_{TX}N_{FL}} \quad (1)$$

The electrical signal 111 generated by the transmitted light detector 106 varies with the resonance parameter in a sense opposite to the electrical signal 109 generated by the fluorescent light detector 105, as shown in FIGS. 3A and 3B. Consequently, the sign inverter 163 is used to invert the sign of the electrical signal 109 to generate the weighted electrical signal 164 that is applied to the summing element 161. As a result, the summing element subtracts the noises in these signals, which leads to the negative sign in the last term of the denominator of equation (1)

Differentiating equation (1) with respect to α and setting the derivative equal to zero yields two solutions for α:

$$a = -\frac{S_{TX}}{S_{FL}} \tag{2}$$

$$a = \frac{N_{TX}(rN_{FL}S_{TX} + N_{TX}S_{FL})}{N_{FL}(N_{FL}S_{TX} + rN_{TX}S_{FL})} \tag{3}$$

The value of α given by equation (2) gives a zero signal-to-noise ratio, and is therefore obviously the minimum. The value of a given by equation (3) is the value that maximizes the signal-to-noise ratio of the detection signal 120, which is what is desired.

The resulting signal-to-noise ratio $SN_{MAX}$ of the detection signal 120 is obtained by substituting the value of α given by equation (3) into equation (1):

$$SN_{\mathrm{MAX}} = \frac{N_{FL}^2S_{TX}^2 + 2rN_{TX}N_{FL}S_{TX}S_{FL} + N_{TX}^2S_{FL}^2}{N_{TX}^2N_{FL}^2(1-r^2)} \tag{4}$$

Equation (3) can be rewritten as:

$$SN_{\mathrm{MAX}} = \frac{\left(\frac{S_{TX}}{N_{TX}}\right)^2 + \frac{2rS_{TX}S_{FL}}{N_{TX}N_{FL}} + \left(\frac{S_{FL}}{N_{FL}}\right)^2}{1-r^2} \tag{5}$$

It can be seen from equation (5) that when the noises are perfectly correlated (r=1), the signal-to-noise ratio of the detection signal is infinite because the noises cancel.

Even when the noises are completely uncorrelated (r=0), the signal-to-noise ratio of the detection signal 120 is greater than that of either of the electrical signals 109 and 111. For example, when the electrical signals 109 and 111 have equal signal-to-noise ratios, the signal-to-noise ratio of the detection signal 120 is double that of the individual signal-to-noise ratios.

In some types of high-precision instrument that employ a photon-quantum absorber interaction, the quantum absorber may have one or more intermediate states between the above-described ground state and excited state, and the quantum absorber may return from the excited state to the ground state via one or more of the intermediate states. In this case, the fluorescent light 117 will include more than one frequency component.

When the fluorescent light 117 include s more than one frequency component, the fluorescent light detector 105 may have a broadband sensitivity and detect all of the frequency components. Alternatively, as shown in FIGS. 5A and 5B, the fluorescent light detector 105 may be composed of more than one detector, each detecting a different frequency component or band of frequency components. In connection with this description of the detectors shown in FIGS. 4A and 4B, the term frequency component will be understood to encompass a band of frequency components.

Figure 4A:
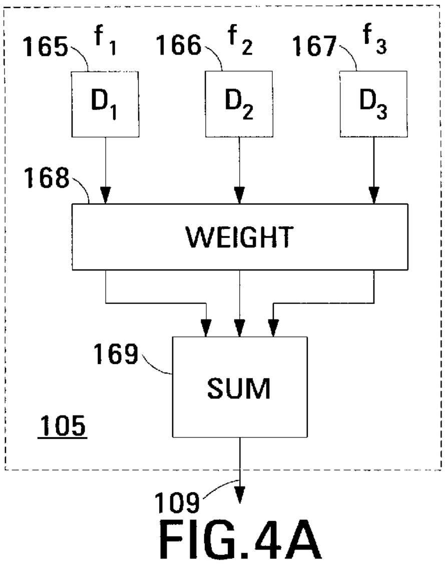
FIG. 4A is a schematic block diagram showing an example of a first embodiment of the fluorescent light detector for use when the fluorescent light includes more than one frequency component, and more than one of the frequency components is detected individually.
Figure 4B:
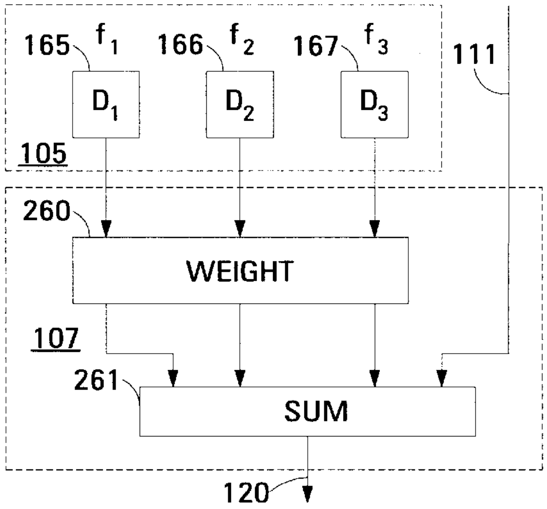
FIG. 4B is a schematic block diagram showing an example of a second embodiment of the fluorescent light detector for use when the fluorescent light includes more than one frequency component, and more than one of the frequency components is detected individually.

In FIGS. 4A and 4B, the fluorescent light detector 105 is shown as including the detectors 165, 166 and 167 that detect different frequency components respectively having frequencies off $f_1$, $f_2$ and $f_3$. Each of the detectors generates an electrical signal in response to the frequency component it detects. The electrical signal has a signal-to-noise ratio. The number of detectors may be more or fewer than the number shown.

In the embodiment shown in FIG. 4A, the electrical signals generated by the detectors 165, 166 and 167 are weighted and summed by the weighting element 168 and the summing element 169 to generate the electrical signal 109. When the electrical signals from two detectors, e.g., 165 and 166, are weighted and combined, the weighting element 168 weights one of the electrical signals relative to the other by a factor that satisfies equation (3) above. When the electrical signals from more than two detectors are weighted and combined, the analysis set forth above can be extended to determine optimum weighting factors for the weighting element 168 to apply to one or more of the electrical signals before they are summed. The weighting element 168 and the summing element 169 are otherwise similar to the weighting element 160 and the summing element 161, described above, and so will not be described further.

Detecting the frequency components of the fluorescent light 117 individually and weighting and summing the resulting electrical signals generates the electrical signal 109 with a signal-to-noise ratio greater than the signal-to-noise ratio of any the electrical signals that are summed by the summing circuit 169.

In the embodiment shown in FIG. 4B, the electrical signals generated by the detectors are 165, 166 and 167 are fed to the weighting element 260 in the combiner 107 in lieu of the electrical signal 109. The analysis set forth above can be extended to determine optimum weighting factors for the weighting element 261 to apply to one or more the electrical signals generated by the detectors 165–167 relative to the electrical signal 111 before the electrical signals are summed. The weighting element 260 is otherwise similar to the weighting element 160, described above, and so will not be described further. The summing element 261 is similar to the summing element 161, described above, except that it sums more than two electrical signals.

The quantum absorber 104 emits the fluorescent light 117 omni-directionally. The embodiments of the fluorescent light detector 105 shown in FIGS. 4A and 4B may be adapted to provide multiple, spatially-dispersed detectors located to detect respective angular components of the fluorescent light. The electrical signals generated by the detectors are be weighted and summed using a combining arrangement similar to that shown in FIGS. 4A or 4B. Using multiple detectors to detect respective angular components of the fluorescent light and summing the electrical outputs of the detectors with appropriate weighting can further increase the signal-to-noise ratio of the detection signal 120.

A CPT-based frequency standard that incorporates the detector 101 according to the invention will now be described with reference to FIGS. 5, 6, 7A and 7B as a practical example of a high-precision instrument according to the invention. It will be apparent to one of ordinary skill in the art that the detector 101 according to the invention can easily be substituted for the conventional detector used in such other high-precision instruments that employ a photon-quantum absorber interaction. Examples of such instruments include microwave cavity-based frequency standards, magnetometers and laser spectrometers.

Figure 5:
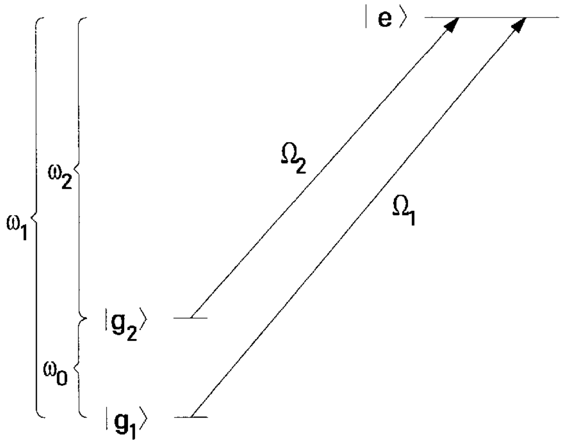
FIG. 5 is an energy diagram showing a simplified quantum absorber transition having only three quantum states.

In a CPT-based frequency standard, a detection signal that quantifies a resonant interaction between a quantum absorber and frequency components of incident light is generated. FIG. 5 is an energy diagram showing the quantum absorber in a simplified form. The transitions between the lower ground state $|g_1>$ and the excited state $|e>$ and between the upper ground state $|g_2>$ and the excited state have energies corresponding to transition frequencies of $\omega_1$ and $\omega_2$.

The incident light includes two main frequency components having frequencies of $\Omega_1$ and $\Omega_2$. When the frequencies of the main frequency components satisfy the following conditions:

$$\Omega_1-\Omega_2=\omega_1-\omega_2 \tag{6}$$

and $$\Omega_1+\Omega_2=\omega_1+\omega_2 \tag{7}$$

a specific coherence is established in the quantum absorber between the ground states $|g_1>$ and $|g_2>$. When in this specific coherence between the ground states, the quantum absorber does not interact with the main frequency components having frequencies of $\Omega_1$ and $\Omega_2$. The quantum absorber does not absorb the incident light and does not emit fluorescent light in response to the incident light. This leads to the name dark state or coherent population trapping (CPT) state for the specific coherence between the ground states. The minimum in the fluorescent light or the maximum in the transmitted light can be used to quantify the resonance condition established when the conditions set forth in equations (6) and (7) are met.

FIG. 6 is a schematic block diagram showing an embodiment of a CPT-based frequency standard 300 as a working example of a precision instrument according to the invention. The frequency standard is composed of the light source 102, the quantum absorber 104, the detector 101 according to the invention, the carrier frequency controller 108, the frequency difference controller 110 and the voltage-controlled oscillator (VCO) 112. The frequency standard additionally includes the oscillators 141 and 142 and the frequency difference tracking signal injector 143.

The light source 102 generates the incident light 116 that illuminates the quantum absorber 104. The detector 101 is located to detect two forms of electro-magnetic radiation from the quantum absorber and generate the detection signal 120 in response to the electro-magnetic radiation. The electro-magnetic radiation detected by the detector is the fluorescent light 117 generated by the quantum absorber in response to the incident light, and the unabsorbed portion of the incident light transmitted through the quantum absorber, i.e., the transmitted light 118. The detection signal 120 generated by the detector is fed to the carrier frequency controller 108 and the frequency difference detector 110.

The incident light 116 generated by the light source 102 includes two main frequency components having frequencies of $\Omega_1$ and $\Omega_2$. The frequencies $\Omega_1$ and $\Omega_2$ of the main frequency components are equal to the transition frequencies $\omega_1$ and $\omega_2$, respectively, of the quantum absorber transition. A main frequency component having a frequency that differs from a transition frequency by less than about three times the transition line width will be regarded in this disclosure as having a frequency equal to the transition frequency.

In the embodiment shown, the light source 102 is composed of a single source of light, and the light generated by the source of light is modulated in response to the modulation drive signal 124 to generate the incident light 116 with the above-mentioned main frequency components. Examples of the structure of the light source will be described in more detail below with reference to FIGS. 7A and 7B.

The carrier frequency $\Omega_C$ of the incident light 116 generated by the light source 102 is controlled by the carrier frequency controller 108, which will be described below, and is modulated by the modulation drive signal 124 generated by the frequency difference tracking signal injector 143. The frequency of the modulation drive signal 124 is defined by the modulation clock signal 126 generated by the VCO 112. The frequency $\Omega_M$ of the modulation clock signal is preferably set to a frequency equal to $\omega_0/2$, where $\omega_0=(\omega_1-\omega_2)$, by the frequency difference controller 110, as will be described in more detail below. A modulation frequency equal to $\Omega_M$ sets the frequency difference between the main frequency components to $\omega_0$. Alternatively, the frequency $\Omega_M$ may be set to $\omega_0/n$, where n is an integer.

The VCO 112 generates the modulation clock signal 126, which it feeds to the input of the frequency difference tracking signal injector 143 interposed between the VCO and the light source 102. The frequency difference tracking signal injector will be described below. The VCO additionally feeds the modulation clock signal to the output 133. The modulation clock signal fed to the output 133 can be used as a frequency standard signal. Alternatively, conventional phase-locked loop and frequency divider circuits (not shown), or other techniques, can be used to generate from the modulation clock signal 126 a frequency standard signal having a more convenient frequency. Such frequency standard signal has a frequency accuracy and stability defined by the modulation clock signal 126.

As will be described in further detail below, the frequency difference tracking signal injector 143 generates the modulation drive signal 124 from the modulation clock signal 126 and feeds the modulation drive signal to the light source 102. The amplitude of the modulation drive signal determines the modulation of the incident light 116 generated by the light source. The modulation is chosen to generate the incident light with at least the main frequency components described above. The incident light is modulated with a modulation index $\beta$, which is the ratio of the deviation $\Delta\Omega$ of the frequency of the incident light caused by the modulation to the modulation frequency $\Omega_M$, i.e., $\beta=\Delta\Omega/\Omega_M$, and is typically in the range from 1.5 to 3.

As noted above, the carrier frequency $\Omega_C$ of the incident light 116 generated by the light source 102, i.e., the unmodulated frequency of the incident light, is controlled by the control signal 122 generated by the carrier frequency controller 108. To aid the operation of the carrier frequency controller, the carrier frequency is additionally modulated by the carrier frequency tracking signal 130 generated by the oscillator 141. The frequency of the carrier frequency tracking signal should be greater than the line width of the resonance at the frequency $\omega_0$, as shown in FIGS. 3A, 3B and 3C, described above. A typical value is 10 kHz. The oscillator 141 feeds the carrier frequency tracking signal to the light source 102 and also to the carrier frequency controller 108.

The carrier frequency controller 108 operates in response to the detection signal 120 and the carrier frequency tracking signal 130 to set the carrier frequency $\Omega_C$ of the incident light 116 generated by the light source 102 to a frequency equal to $(\omega_1+\omega_2)/2$. Modulation of this carrier frequency with a modulation frequency $\Omega_M$ equal to $(\omega_1-\omega_2)/2$, as described above, generates the main frequency components with frequencies $\Omega_1$ and $\Omega_2$ equal to $\omega_1$ and $\omega_2$, respectively. The carrier frequency controller includes a synchronous detector (not shown) that operates in response to the carrier frequency tracking signal to detect variations in the detection signal 120 at the frequency of the carrier frequency tracking signal. The carrier frequency controller generates the control signal 122 from the detected variations. The control signal 122 controls one or more appropriate parameters of the light source 102 to set the carrier frequency $\Omega_C$.

The frequency $\Omega_M$ of the modulation clock signal 126 generated by the VCO 112, and, hence, the modulation frequency of the incident light 116, are set by the control signal 128 generated by the frequency difference controller 110. The frequency $\Omega_M$ is preferably set to $\omega_0/2$, where $\omega_0=(\omega_1-\omega_2)$. To aid the operation of the frequency difference controller, the oscillator 142 generates the frequency difference tracking signal 132. The frequency of the frequency difference tracking signal should be less than or equal to the line width of the resonance at the frequency $\omega_0$, as shown in FIGS. 3A, 3B and 3C. A typical value is 100 Hz. The output of the oscillator 142 is connected to an input of the frequency difference controller and to an input of the frequency difference tracking signal injector 143.

The frequency difference tracking signal injector 143 receives the modulation clock signal 126 from the VCO 112 and the frequency difference tracking signal 132 from the oscillator 142. The frequency difference tracking signal injector modulates the frequency of the modulation clock signal 126 at the frequency of the frequency difference tracking signal to generate the modulation drive signal 124. The frequency difference tracking signal generator additionally sets the amplitude of the modulation drive signal to modulate the incident light at the desired modulation index. The frequency difference tracking signal injector also isolates the frequency standard signal fed to the output 133 from the frequency difference tracking signal to prevent the latter signal from impairing the accuracy and stability of the former signal.

The frequency difference controller 110 includes a synchronous detector (not shown) that operates in response to the frequency difference tracking signal 132 to detect variations in the detection signal 120 at the frequency of the frequency difference tracking signal. The frequency difference controller uses the detected variations to generate the control signal 128 that sets the frequency $\Omega_M$ of the modulation clock signal 126 generated by the VCO 112 to a value preferably equal to $\omega_0/2$.

Figure 7A:
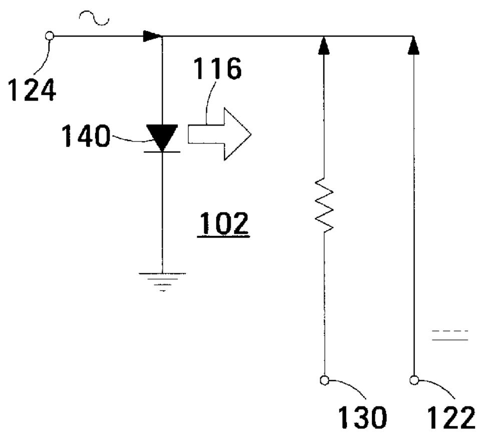
FIG. 7A is a schematic block diagram showing the configuration of a first example of the light source of the frequency standard shown in FIG. 6.

FIG. 7A is a schematic block diagram showing the structure of a first example of the light source 102. In this example, the light source includes the laser 140 that generates the incident light 116. The laser receives the control signal 122 from the carrier frequency controller 108 as its DC drive signal, and additionally receives the modulation drive signal 124 from the frequency difference tracking signal injector 143 and the carrier frequency tracking signal 130 from the oscillator 141.

The frequency of the light generated by a semiconductor laser depends on the drive current through the laser. Consequently, in this embodiment, the DC drive signal 122 determines the frequency $\Omega_C$ of the incident light 116 generated by the laser. The frequency of the incident light is modulated by superimposing the modulation drive signal 124 on the DC drive signal. The frequency of the incident light is additionally modulated by superimposing the carrier frequency tracking signal 130 on the DC drive signal.

Figure 7B:
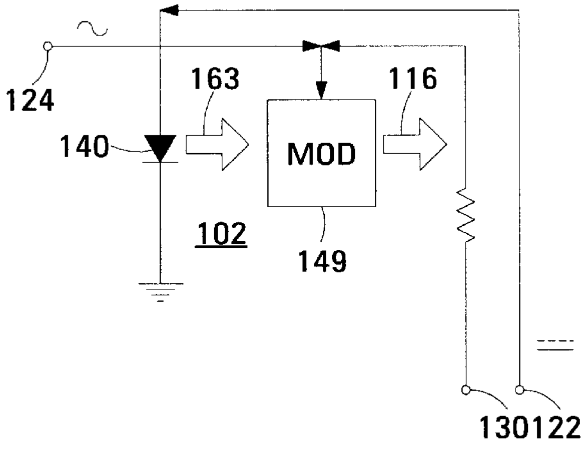
FIG. 7B is a schematic block diagram showing the configuration of a second example of the light source of the frequency standard shown in FIG. 6.

FIG. 7B is a schematic block diagram showing the structure of a second example of the light source 102 in which a modulator external to the laser is used to modulate the incident light. In this example, the light source includes the laser 140 and the modulator 149. The laser receives the control signal 122 from the carrier frequency controller 108 as its DC drive signal. The modulator receives the modulation drive signal 124 from the spectrum controller 114, and additionally receives the carrier frequency tracking signal 130 from the oscillator 141. The laser generates the light 163, which is fed to the modulator 149. The modulator modulates at least one of the frequency, amplitude and phase of the light 163 in response to the modulation drive signal and the carrier frequency tracking signal to generate the incident light 116. The carrier frequency tracking signal 130 may alternatively be fed to the laser 140.

The light source 102 may include additional optical elements (not shown) such as lenses, polarizers, wave plates, prisms and optical fibers that further define the characteristics of the incident light 116. For example, a polarizer and a wave plate (not shown) that circularly polarize the incident light may be located between the laser 140 and the quantum absorber 104.

In the preferred embodiment of the frequency standard 300, atoms of rubidium-87 in the vapor state are used as the quantum absorber 104. Atoms of cesium-133 or another alkali metal may alternatively be used. The light source 102 is operated to generate the incident light 116 with a wavelength of 795 nm, which corresponds to the $D_1$ line of rubidium-87. The $D_1$ line of cesium would require the light source to generate the incident light with a wavelength of 895 nm. Alternatively, suitable other atoms, ions or molecules may be used as the quantum absorber, provided that such other atoms, ions or molecules have an optical transition with the properties set forth above.

In a preferred embodiment of the frequency standard 300 that uses a vapor of rubidium-87 atoms as the quantum absorber 104, the rubidium atoms are confined in a cell (not shown) structured to allow the incident light 116 to illuminate the quantum absorber and to allow the fluorescent light 117 generated by the quantum absorber in response to the incident light and transmitted light 118 to reach the detector 101. For example, the cell may be cylindrical in shape and made of a transparent material such as, but not limited to, glass, fused quartz or sapphire.

When a cylindrical cell is used, it is located relative to the light source 102 and the detector 101 so that the incident light 116 passes through one end wall of the cell, and the transmitted light 118 leaves the cell through the opposite end wall and impinges on the transmitted light detector 106 in the detector 101. The fluorescent light 117 generated by the quantum absorber in response to the incident light leaves the cell mainly through its curved side walls and is collected by a reflective collector (not shown) that surrounds the cell. The collector concentrates the fluorescent light on the fluorescent light detector 105 in the detector 101. For example, the cell can be located inside an elliptical, reflective cylinder aligned with one focal axis and the fluorescent light detector can be located inside the cylinder aligned with the other focal axis.

The transmitted light and the fluorescent light have intensities that depend on the frequency difference between the main frequency components of the incident light 116. The electrical signals 109 and 111 respectively generated by the fluorescent light detector 105 and the transmitted light detector 106 and the detection signal 120 vary in accordance with the difference $\Delta\Omega$ between the main frequency components with a characteristic similar to those shown in FIGS. 3A, 3B and 3C, respectively, provided that the relationship $\{(\Omega_1+\Omega_2)-(\omega_1+\omega_2)\}$ remains fixed. In this example, the resonance parameter shown in FIGS. 3A, 3B and 3C is the frequency difference $\Delta\Omega$.

The detection signal 120 generated by the detector 101 in response to the individually-detected fluorescent light 117 and transmitted light 118 from the quantum absorber 104 has an extremum when the frequency difference $\Delta\Omega$ between the frequencies of the main frequency components is equal to the difference $\omega_0$ between the transition frequencies $\omega_1$ and $\omega_2$ of the quantum absorber.

A background slope in the spectral density of the electro-magnetic radiation detected by the detector 101 can introduce an error in the frequency at which the extremum in the detection signal 120 occurs. Such error can be reduced by suitable detection methods including detecting the extremum in the detection signal at the frequency of the third harmonic of the frequency difference tracking signal 132. References in this disclosure to the detection signal having an extremum are to be taken to refer to the extremum in the detection signal detected in a way, such as that just described, that reduces any errors caused by a background slope in the spectral density of the detected electro-magnetic radiation.

The working temperature of the cell confining the quantum absorber 104 is stabilized at a suitable temperature. The cell is filled with a vapor of rubidium-87 atoms that act as the quantum absorber and preferably additionally contains solid or liquid rubidium so that the vapor is saturated. In a practical embodiment, the rubidium vapor was maintained at a temperature of about 60° C., with a stability of a few millidegrees C. A lower temperature can be used when cesium atoms are used as the quantum absorber.

The inside surface of the cell can be coated with a hydrocarbon wax. Additionally or alternatively, the cell can contain a buffer gas. These measures reduce interactions of the atoms constituting the quantum absorber with the walls of the cell and with others of the atoms of the quantum absorber and additionally provide a minimally-perturbing confinement of the quantum absorber. Reducing these interactions and providing confinement reduces the width of the resonance shown in FIGS. 4A, 4B and 4C, and, hence, increases the precision with which the resonance can be detected. One or more noble gasses, nitrogen, a gaseous hydrocarbon such as methane, ethane or propane, or a mixture of such gasses may be used as the buffer gas.

The cell is enclosed in an enclosure of a magnetic shielding material to isolate the quantum absorber from external magnetic fields. A substantially homogeneous magnetic field is applied to the quantum absorber to separate the $m_F=0-m_F=0$ resonance from other resonances and to provide a quantizing axis. In a practical embodiment, the magnetic field strength was typically in the range from 1 to 100 $\mu$T.

Figure 8:
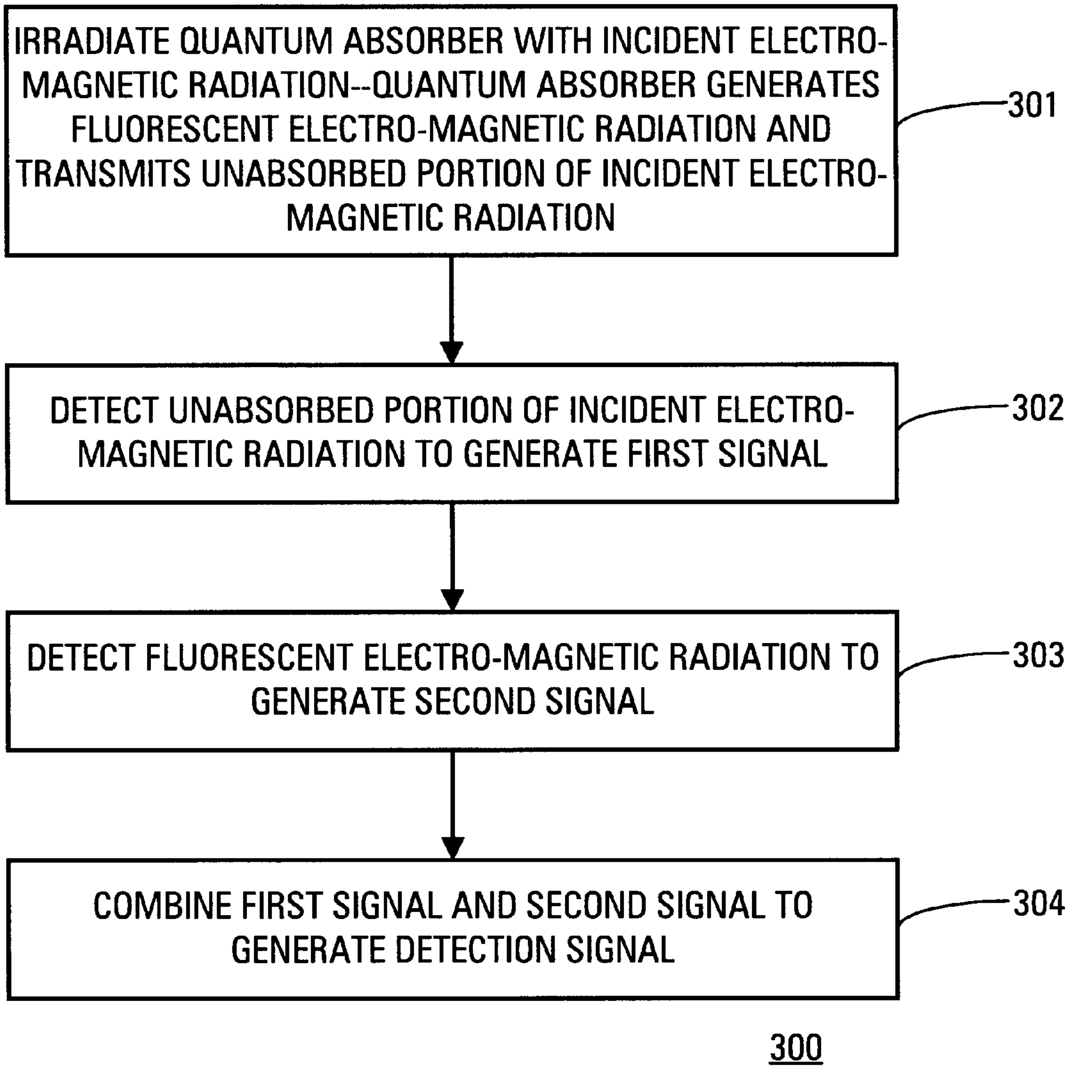
FIG. 8 is a flow chart showing the detection method according to the invention.

FIG. 8 is a flow chart showing the detection method 300 according to the invention. The detection method generates a detection signal quantifying a resonant interaction between a quantum absorber and incident electro-magnetic radiation.

In process 301, the quantum absorber is irradiated with the incident electro-magnetic radiation. The quantum absorber absorbs a portion of the incident electro-magnetic radiation and generates fluorescent electro-magnetic radiation in response to the absorbed incident electro-magnetic radiation. The quantum absorber additionally transmits an unabsorbed portion of the incident electro-magnetic radiation.

In process 302, the unabsorbed portion of the incident electro-magnetic radiation is detected to generate a first signal. The first signal has a first signal-to-noise ratio.

In process 303, the fluorescent electro-magnetic radiation is detected to generate a second signal. The second signal has a second signal-to-noise ratio.

In process 304, the first signal and the second signal are combined to generate the detection signal. The detection signal having a signal-to-noise ratio greater than either of the first signal-to-noise ratio and the second signal-to-noise ratio.

The various embodiments of the detector, detection method and precision instrument according to the invention are described above in terms of a quantum absorber that has transitions with energies that correspond to the electro-magnetic radiation commonly known as near infra-red light. It will be apparent to a person of ordinary skill in the art that the embodiments described above can easily be modified to operate with a quantum absorber that has transitions with energies that correspond to electro-magnetic radiation in other parts of the spectrum including, but not limited to ultra-violet light, visible light, far infra-red radiation and microwave radiation. Suitable generators and detectors for electro-magnetic radiation in these parts of the spectrum are known in the art.

Although this disclosure describes illustrative embodiments of the invention in detail, it is to be understood that the invention is not limited to the precise embodiments described, and that various modifications may be practiced within the scope of the invention defined by the appended claims.

We claim:

1. A method for generating a detection signal quantifying a resonant interaction between a quantum absorber and incident electro-magnetic radiation, the method comprising:

irradiating the quantum absorber with the incident electro-magnetic radiation, the quantum absorber absorbing a portion of the incident electro-magnetic radiation and generating fluorescent electro-magnetic radiation in response thereto, and additionally transmitting an unabsorbed portion of the incident electro-magnetic radiation;

detecting the unabsorbed portion of the incident electro-magnetic radiation to generate a first signal having a first signal-to-noise ratio;

detecting the fluorescent electro-magnetic radiation to generate a second signal having a second signal-to-noise ratio; and combining the first signal and the second signal to generate the detection signal, the detection signal having a signal-to-noise ratio greater than the first signal-to-noise ratio and the second signal-to-noise ratio.

2. The method of claim 1, in which combining the first signal and the second signal includes weighting one of the first signal and the second signal with respect to the other to generate a respective weighted signal.

3. The method of claim 2 in which combining the first signal and the second signal includes summing the weighted signal with the other of the first signal and the second signal.

4. The method of claim 1, in which:

the resonant interaction depends on an external factor; and the method additionally comprises using the detection signal to quantify the external factor.

5. The method of claim 1, in which:

the interaction between the quantum absorber and the incident electro-magnetic radiation provides a frequency reference for generating a frequency standard signal;

the quantum absorber has transitions including a first transition between a first lower quantum state and an upper quantum state, and a second transition between a second lower quantum state and the upper quantum state, the first transition and the second transition having energies that correspond to transition frequencies of $\omega_1$ and $\omega_2$, respectively, the lower quantum states differing in energy by an energy difference;

the incident electro-magnetic radiation includes main frequency components at frequencies of $\Omega_1$ and $\Omega_2$, equal to $\omega_1$ and $\omega_2$, respectively, and differing in frequency by a frequency difference; and the method additionally comprises:

controlling the frequency difference between the main frequency components to obtain an extremum in the detection signal, the extremum indicating that the frequency difference corresponds to the energy difference between the lower quantum states of the quantum absorber, and providing a signal related in frequency to the frequency difference as the frequency standard signal.

6. The method of claim 1, in which:

detecting the fluorescent electro-magnetic radiation includes individually detecting different components of the fluorescent electro-magnetic radiation frequencies to generate respective third signals; and combining the third signals to generate the second signal.

7. The method of claim 6, in which combining the third signals includes:

weighting one of the signals relative to another of the third signals to generate a respective weighted third signals, and summing the weighted third signals to generate the second signal.

8. The method of claim 1, in which:

detecting the fluorescent electro-magnetic radiation includes individually detecting different components of the fluorescent electro-magnetic radiation to generate respective third signals; and in combining the first signal and the second signal to generate the detection signal, the third signals are combined with the first signal in lieu of the second signal.

9. The method of claim 8, in which combining the third signals and the first signal includes:

weighting at least one of the first signal and the third signals with respect to others of the signals to generate at least one respective weighted signal; and summing the at least one respective weighted signal and the unweighted signals to generate the detection signal.

10. A detector for generating a detection signal quantifying a resonant interaction between a quantum absorber and incident electro-magnetic radiation, the detector comprising:

a first detector located to receive a portion of the incident electro-magnetic radiation that remains unabsorbed by the quantum absorber and operating to generate a first signal in response thereto, the first signal having a first signal-to-noise ratio;

a second detector located to receive fluorescent electro-magnetic radiation generated by the quantum absorber in response to the incident electro-magnetic radiation and operating to generate a second signal in response thereto, the second signal having a second signal-to-noise ratio; and a combiner connected to receive the first signal and the second signal and operating to generate the detection signal therefrom, the detection signal having a signal-to-noise ratio greater than the first signal-to-noise ratio and the second signal-to-noise ratio.

11. The detector of claim 10, in which the combiner includes weighting element connected to receive the first signal and the second signal and to weight one of the first signal and the second signal with respect to the other to generate a respective weighted signal.

12. The detector of claim 11, in which the combiner additionally includes a summing element connected to receive the weighted signals and operating to sum the weighted signal.

13. The detector of claim 10, in which the second detector includes:

sub-detectors each detecting a different component of the fluorescent electro-magnetic radiation to generate a respective third signal; and an additional combiner connected to receive the third signals and operating to generate the second signal therefrom.

14. The detector of claim 10, in which:

the second detector includes sub-detectors each detecting a different component of the fluorescent electro-magnetic radiation to generate a respective third signal; and the combiner is connected to receive the third signals in lieu of the second signal.

15. A precision instrument, comprising:

a source of incident electro-magnetic radiation;

a quantum absorber located to receive the incident electro-magnetic radiation from the source, the quantum absorber absorbing a portion of the incident electro-magnetic radiation and generating fluorescent electro-magnetic radiation in response thereto, and additionally transmitting an unabsorbed portion of the incident electro-magnetic radiation;

a first detector located to receive the unabsorbed portion of the incident electro-magnetic radiation and operating to generate a first signal in response thereto, the first signal having a first signal-to-noise ratio;

a second detector located to receive the fluorescent electro-magnetic radiation and operating to generate a second signal in response thereto, the second signal having a second signal-to-noise ratio; and a combiner connected to receive the first signal and the second signal and operating to generate a detection signal therefrom, the detection signal having a signal-to-noise ratio greater than the first signal-to-noise ratio and the second signal-to-noise ratio.

16. The precision instrument of claim 15, in which:

the precision instrument generates a frequency standard signal;

the quantum absorber has transitions including a first transition between a first lower quantum state and an upper quantum state, and a second transition between a second lower quantum state and the upper quantum state, the first transition and the second transition having energies that correspond to transition frequencies of $\omega_1$ and $\omega_2$, respectively, the lower quantum states differing in energy by an energy difference;

the source is configured to generate the incident electro-magnetic radiation to include main frequency components at frequencies of $\Omega_1$ and $\Omega_2$, equal to $\omega_1$ and $\omega_2$, respectively, and differing in frequency by a frequency difference; and the precision instrument additionally comprises:

a difference frequency controller that operates in response to the detection signal to control the source to generate the main frequency components with the frequency difference that obtains an extremum in the detection signal, the extremum indicating that the frequency difference corresponds to the energy difference between the lower quantum states of the quantum absorber, and an oscillator that operates in response to the frequency difference controller to provide a signal related in frequency to the frequency difference as the frequency standard signal.

17. The precision instrument of claim 16, additionally comprising a carrier frequency controller that operates in response to the detection signal to control the source to generate the incident electro-magnetic radiation with one of the main frequency components at the frequency equal to the corresponding one of the transition frequencies.

18. The precision instrument of claim 15, in which the second detector includes:

sub-detectors each detecting a different component of the fluorescent electro-magnetic radiation to generate a respective third signal; and an additional combiner connected to receive the third signals and operating to generate the second signal therefrom.

19. The precision instrument of claim 15, in which:

the second detector includes sub-detectors each detecting a different component of the fluorescent electro-magnetic radiation to generate a respective third signal; and the combiner is connected to receive the third signals in lieu of the second signal.

* * * * *